July 16, 1968     J. H. KEATING     3,393,086
COOKING UTENSIL AND METHOD OF COATING THE SAME
WITH A POLYTETRAFLUOROETHYLENE LAYER
Filed May 17, 1965     2 Sheets-Sheet 1
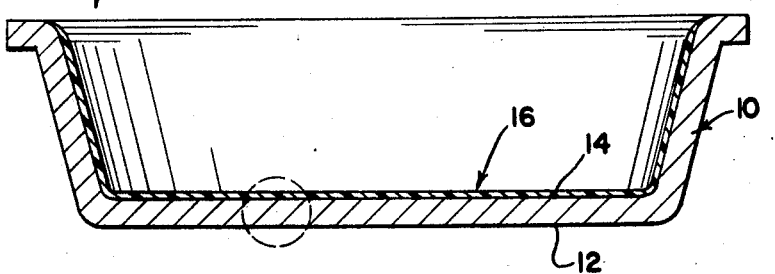
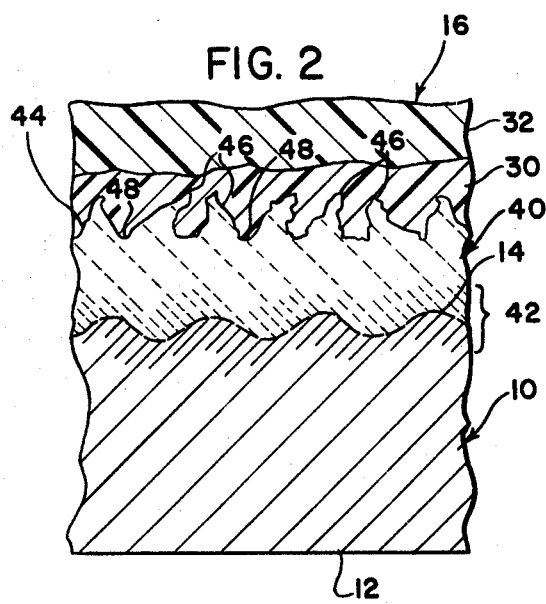
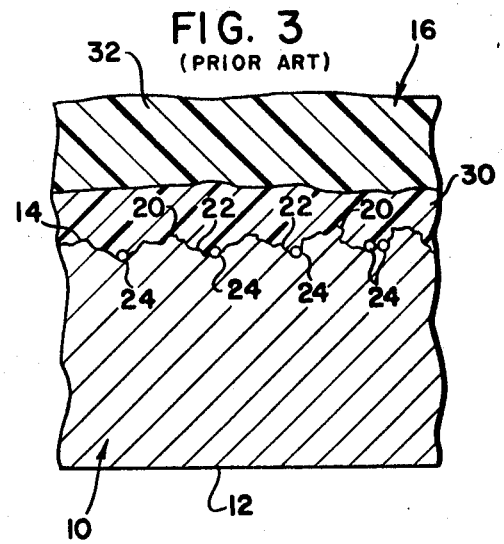
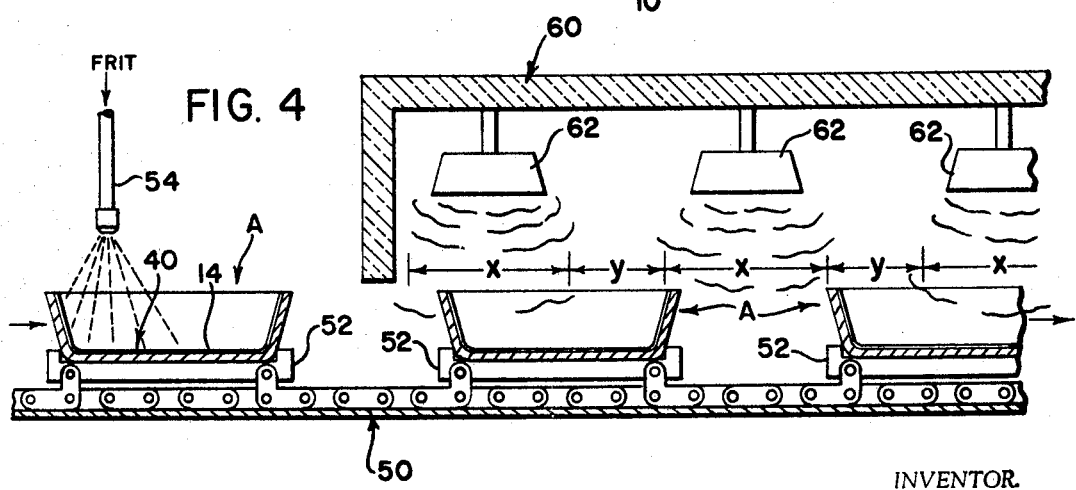
INVENTOR.
JOHN H. KEATING
BY *Tilberry & Body*
ATTORNEYS

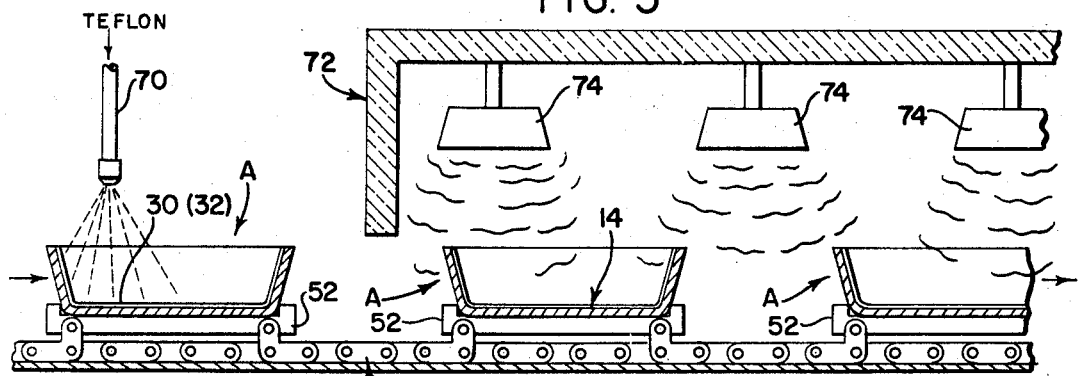
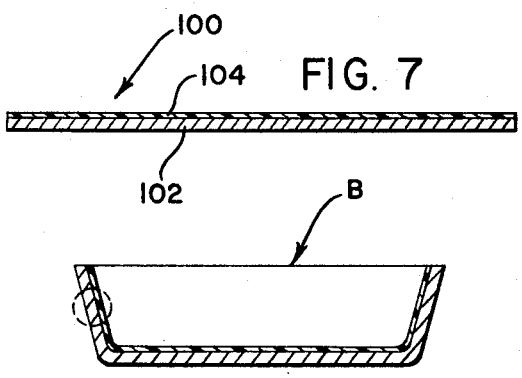
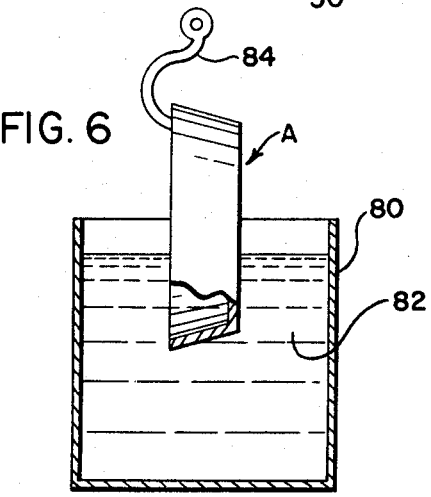
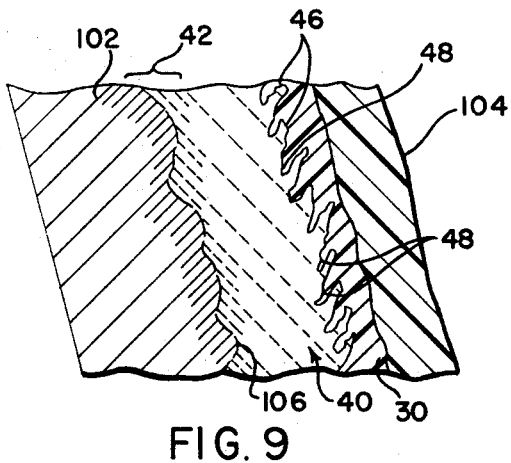
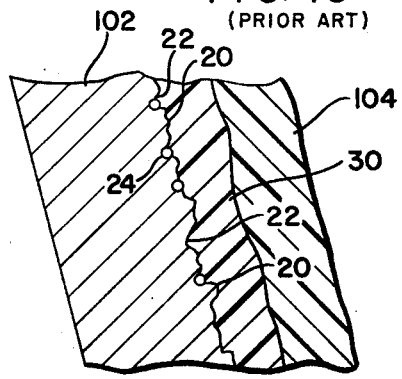

United States Patent Office 3,393,086
Patented July 16, 1968

3,393,086
COOKING UTENSIL AND METHOD OF COATING THE SAME WITH A POLYTETRAFLUOROETH-YLENE LAYER
John H. Keating, Cleveland, Ohio, assignor, by mesne assignments, to Standard International Corporation, Andover, Mass., a corporation of Ohio
Filed May 17, 1965, Ser. No. 456,336
4 Claims. (Cl. 117—70)

ABSTRACT OF THE DISCLOSURE

There is provided a method of coating an aluminum cooking utensil with a non-stick material such as polytetrafluoroethylene. By this method, a ceramic matte finish is provided by firing a heavy metal frit onto the surface to be coated. This firing is accomplished by alternately heating the surface between a higher temperature of approximately 1200° F. and a lower temperature below the melting temperature of the aluminum. The periods at the higher temperature have a length sufficiently short to prevent melting of the aluminum. A polytetrafluoroethylene coating is then applied to the ceramic matte finish.

DISCLOSURE

This invention pertains to the art of manufacturing cooking utensils and similar products, and more particularly to a cooking utensil and method of coating the same with a polytetrafluoroethylene layer.

It has become common practice to provide the actual cooking surface of a utensil, such as a skillet or baking pan, with a coating or layer of polytetrafluoroethylene, marketed by E. I. du Pont de Nemours & Co. under the trademark of Teflon. Since polytetrafluoroethylene is known in the trade by the name Teflon, this trade name will be used hereinafter; however, it should be appreciated that "Teflon" or "polytetrafluoroethylene" is used herein as a generic term to indicate the fluorocarbon resin polytetrafluoroethylene or an equivalent substance, be it a fluorocarbon resin or not.

The Teflon layer on the cooking surface of a utensil allows food to be cooked in the utensil without sticking or adhering to the cooking surface, even though a shortening is not used. Because of the non-sticking characteristics of the Teflon, a utensil provided with a Teflon layer can be easily cleaned between uses with a minimum of effort. For these reasons, cooking utensils with Teflon coated cooking surfaces have become very successful and widely used.

Although acclaimed as a substantial improvement in the art of cooking utensiles, the use of Teflon on the cooking surface has not been free from certain disadvantages. For instance, because of the inherent non-sticking characteristics of Teflon, the physical bond between the Teflon and the cooking surface has, in the past, been relatively weak. Not only did the Teflon fail to adhere to substances being cooked, but the Teflon also did not form a tenacious bond with the metal forming the cooking surface of the utensil. Consequently sharp instruments used in removing food substances from the utensil and abrasives used in washing or cleaning the utensils caused rapid removal or destruction of the Teflon coating. For this reason, unless extreme care was exercised by the housewife, the Teflon coating on the cooking utensil had a relatively short useful life.

It was also found that when a small portion of the Teflon coating or layer was separated from the cooking surface of the utensil, the separation of the Teflon would usually progress over a wider area because of the weak bond of the Teflon on the cooking surface.

When the Teflon was scraped, or otherwise removed from the cooking surface, the benefits of the Teflon surface were lost, and the utensil was then discarded or used in a manner similar to utensils without a Teflon cooking surface.

These and other disadvantages of prior Teflon coated cooking utensils are completely overcome by the present invention which is directed toward an improved method of coating Teflon to the cooking surface of a utensil, or a similar metal object, wherein the bond between the cooking surface and the Teflon is stronger than heretofore possible.

In accordance with the present invention, there is provided an improvement in a cooking utensil comprising a metal receptacle with an inner dish-like surface defining a food receiving cavity and a layer of Teflon covering the inner surface. This improvement comprises a bonding layer intermediate the cooking surface and the Teflon layer. This bonding layer comprises fired ceramic material which is chemically bonded to the cooking surface and mechanically adhered to the Teflon layer.

As will be hereinafter described in detail, this fired ceramic intermediate layer provides a tenacious bond between the Teflon and the cooking surface and prevents easy removal or separation of the Teflon coating. In this manner, the life of the utensil is substantially increased over the life of a similar utensil without the intermediate layer of fired ceramic material.

In accordance with another aspect of the present invention, there is provided a method of adhering a Teflon layer onto a metal surface. This method comprises the steps of applying a mixture of frit and a carrier onto the surface, firing the frit mixture to produce a ceramic layer having an exposed matte finish, applying Teflon onto the matte finish, and, then, curing the Teflon. The term "matte finish" refers to a surface texture which is roughened. It is well known that frit may be fired to produce this type of surface instead of the glazed surface of poreclain. For instance, ceramic chalkboards have such a matte surface.

It is appreciated that the term "frit" as used herein refers to the commercial particulated raw material utilized in forming ceramic by a subsequent firing process. In accordance with a more limited aspect of the present invention, the commercial frit which is fired to produce the matte finish preparatory to coating Teflon on the cooking surface of a utensil is one of the heavy metal frits, such as lead frit, cadmium frit, zinc frit, or antimony frit. These heavy metal frits have a melting point in the general range of 950–1,000° F. which adapts them for use on aluminum cooking utensils where the melting temperature of the utensil is substantially in this same temperature range.

In accordance with still a further aspect of the present invention, the frit utilized to produce the intermediate bonding layer includes finely divided particles of aluminum oxide. These particles do not melt while the frit is being fired, and they produce a jagged matte surface to which Teflon may be cured in a manner to provide a strong physical and chemical bond between the ceramic intermediate layer and the Teflon.

The primary object of the present invention is the provision of a method of coating Teflon onto a metal surface, which method produces a stronger bond than heretofore possible between the Teflon and the metal surface.

Another object of the present invention is the provision of a method of coating Teflon onto a metal surface, which method includes applying a ceramic layer between the metal surface and the Teflon coating.

Still another object of the present invention is the provision of a method of coating Teflon onto a metal surface, which method includes applying a ceramic layer, having aluminum oxide particles embedded therein, between the metal surface and the Teflon coating.

Yet another object of the present invention is the provision of a cooking utensil having a Teflon coating on the cooking surface thereof wherein the coating is bonded to the surface by an intermediate ceramic layer.

Still another object of the present invention is the provision of a cooking utensil having a Teflon coating on the cooking surface thereof wherein the coating is bonded to the surface by an intermediate ceramic layer having embedded particles of aluminum oxide.

These and other objects and advantages will become apparent from the following description used to illustrate the preferred embodiment of the present invention as read in connection with the accompanying drawings in which:

FIGURE 1 is a cross-sectional, schematic view illustrating the preferred embodiment of the present invention used on a cast cooking utensil;

FIGURE 2 is an enlarged, cross-sectional view taken generally in the area of the circle shown in FIGURE 1;

FIGURE 3 is an enlarged, cross-sectional view similar to FIGURE 2 and representing the prior art to which the present invention is an improvement;

FIGURE 4 is a side elevational view illustrating, somewhat schematically, initial processes contemplated by the present invention;

FIGURE 5 is the side elevational view showing, somewhat schematically, further processes as contemplated by the present invention;

FIGURE 6 is a side elevational view showing, somewhat schematically, a modification of the preferred embodiment of the present invention;

FIGURE 7 is an enlarged, cross-sectional view illustrating the use of the present invention in producing a drawn or formed cooking utensil, as opposed to a cast cooking utensil shown in FIGURES 1–6;

FIGURE 8 is a cross-sectional view showing the structure of FIGURE 7 after the cooking utensil has been shaped;

FIGURE 9 is an enlarged, cross-sectional view taken generally in the area of the circle in FIGURE 8; and, FIGURE 10 is an enlarged, cross-sectional view similar to FIGURE 9 and showing the prior art to which the present invention is an improvement.

Referring now to the drawings wherein the showings are for the purpose of illustrating preferred embodiments of the invention only and not for the purpose of limiting same, FIGURE 1 shows a cooking utensil A, which is illustrated as a skillet. It is appreciated that the utensil or skillet A is shown for illustrative purposes only and various modifications could be made to the form of the utensil without departing from the intended spirit and scope of the present invention.

In accordance with the embodiment of the invention illustrated in FIGURE 1, the utensil A includes an aluminum cast body 10 having an outer surface 12, an inner cooking surface 14 and a Teflon coating or layer 16 overlying the cooking surface. The present invention relates to an improved method of applying the Teflon layer 16 onto the cooking surface 14; however, to fully appreciate the present invention, the prior art method of applying the Teflon layer 16 is hereinafter described in detail.

FIGURE 3 shows a cross-section of a cooking vessel of the prior art to which the present invention is directed. In the past, the cooking surface 14 of the cast body 10 was sand blasted or shot blasted to produce an undulating surface with a multitude of small protrusions 20 and recesses 22. The grit, or other abrasives, used during blasting was pulverized when they were repeatedly impinged against the surface 14. Consequently, small particles 24 of the blasting residue were pounded and embedded into the cooking surface 14. These particles 24 imparted a powdered texture to the surface 14; therefore, adherence of the Teflon 16 to the surface 14 was somewhat inhibited. The sand or shot blasting operation was heretofore believed necessary because the cast surface 14 did not have a sufficient surface area or a roughened texture to provide a satisfactory bond between the Teflon and the cooking surface. After the surface 14 was roughened by blasting, a primer layer 30 of Teflon was applied onto the surface 14. Thereafter, a non-toxic outer layer 32 of Teflon was applied over the primer layer to produce a satisfactory Teflon surface for direct contact with the foodstuffs being prepared within the utensil A. The layers 30, 32 were cured to produce the layer 16 shown in FIGURE 1.

The prior art, as illustrated by FIGURE 3, produced a somewhat weak physical bond between the cooking surface 14 and the primer layer 30. In addition, the surface 14 was relatively soft so that an implement forced through the Teflon layer 16 could cut into the surface 14 to cause easy separation of the Teflon from the cast body 10. All of these disadvantages have been overcome by the present invention.

Referring now to FIGURE 2, the present invention is illustrated in detail. In accordance with this embodiment of the invention, the cast cooking surface 14 is not roughened by mechanical means, such as sand blasting. To the contrary, the surface is only cleansed to remove loose particles. A ceramic layer 40 is formed on the cleaned surface 14. To accomplish this, masticated heavy metal frit, such as lead frit, zinc frit, cadmium frit or antimony frit is sprayed onto the surface and fired at a temperature which does not allow the frit to "flow out." "Flow out" is the common term used in the ceramic art to indicate that the frit is heated to a temperature that will allow complete melting of the frit to produce a glassy outer surface. The flow out temperature is determined by various factors, i.e., the grain size of the frit, the type of frit and the heating time. It is well within the skill of a person in the ceramic art to determine a proper combination of these factors to prevent flow out and to provide a matte surface, as opposed to a glazed surface. In accordance with the invention, the frit is fired to a temperature and for a time which does not result in complete flow out of the frit. This aspect of the invention will be described in more detail in connection with specific examples of the present invention. The intermediate surface 40 has a thickness of only a mil or so. The firing of the frit produces a zone 42 of chemical bond between the cooking surface 14 and the ceramic layer 40. This chemical bond zone 42 is shown as a shaded area in FIGURE 2.

By firing the heavy metal frit to a temperature and for a time which does not allow flow out, it has been found that the upper surface 44 of the ceramic layer 40 has a jagged texture with a multitude of upstanding peaks 46 and intermediate valleys 48. This jagged texture provides a greater surface area and a stronger interlocking bond between the ceramic layer 40 and the primer Teflon layer 30. After the primer Teflon layer 30 is applied to the ceramic layer 40, in a manner to be described hereinafter in more detail, a non-toxic layer 32 of Teflon is applied thereto. This forms the Teflon layer 16 which comes into direct contact with the foodstuff being cooked within the utensil.

In accordance with a modification of the invention, it has been found that the addition of aluminum oxide particles to the heavy metal frit forming ceramic layer 40 provides more jagged and higher standing peaks 46. Aluminum oxide has a melting point substantially higher than the melting or firing temperature of the frit; therefore, the aluminum oxide particles are embedded in the fired frit and produce the upstanding peaks.

When aluminum oxide particles are used in the frit, the grain size of the frit being used, as described in connection with the specific examples of the present invention, may be reduced to such a degree that flow out of the ceramic may take place to a certain extent. This flow out does not inhibit the peaks 46 which are formed primarily by the aluminum oxide. For this reason, when aluminum oxide particles are dispersed within the frit, the frit may have a smaller grain size.

Although a variety of apparatus could be utilized for practicing the present invention, FIGURES 4–5 illustrate, schematically, an apparatus which has proven satisfactory. A conveyor 50 provided with a plurality of longitudinally spaced nests 52 receives skillets A and conveys these skillets longitudinally.

Referring now to FIGURE 4, the heavy metal frit, or a heavy metal frit with aluminum oxide particles, after being mixed within a liquid carrier, is sprayed through a nozzle 54 onto the cooking surface 14 of each of the skillets. Thereafter, conveyor 50 moves the skillets through a furnace 60 provided with a series of spaced infra-red burners 62. These burners produce a high temperature or heating zone $x$ immediately therebelow. In accordance with the present invention, the heavy metal frits have a firing temperature in the range of 950–1,000° F. Accordingly, burners 62 are adjusted to produce a temperature of approximately 1200° F. in the heating zone $x$. The ambient temperature of the furnace 60 is approximately 800° F.; therefore, the cooling zone $y$ between adjacent heating zones $x$ is approximately 800° F.

As the skillets A progress through the furnace 60 they are alternately heated by the infra-red burners to a temperature approaching 1200° F. and, immediately thereafter, they are allowed to cool to a temperature approaching 800° F. By alternately heating and cooling the skillets, the aluminum forming the body 10 of each skillet is not melted while the heavy metal frits are being fired. If a constant temperature of 1200° F. were maintained on the frit for a substantial length of time, the skillets could conceivably melt or sag. This alternate heating and cooling of the skillet has been found to be adequate to fire the frit while the skillet remains physically intact. For this reason, the use of a fired frit, which would appear to be inappropriate for a low melting temperature, such as aluminum, can be used on an aluminum utensil by a proper adjustment of the heating time and cooling time of the skillet.

After the layer 40 is fired to produce the jagged peaks 46 and valleys 48, the conveyor 50 moves the skillets A beneath a nozzle 70. See FIGURE 5. Teflon is sprayed from the nozzle to produce a primer layer 30 having a thickness in the range of .2–.4 mil. Thereafter, the skillets are moved through furnace 72 having a plurality of longitudinally spaced infra-red burners 74. These burners heat the primer layer of Teflon to a temperature of approximately 450° F. which is substantially below the curing temperature of the Teflon, i.e., 750–800° F. The heat absorbed by the aluminum is released into the Teflon during the periods when the skillet is between burners to assist in setting or curing of the Teflon. After the primer layer of Teflon is applied to the cooking surfaces 14 of the skillets, the skillets A are conveyed through another apparatus similar to that shown in FIGURE 5. At this time, the non-toxic Teflon coating 32 is applied to the primer layer 30 so that the total thickness of the Teflon on the cooking surface is in the range of .8–1.2 mils. The complete Teflon coating is then heated to a temperature in the range of 750–800° F. so that the outer non-toxic layer and the primer layer are cured simultaneously.

Although the present invention has been described in connection with an apparatus and method wherein the frit mixed with a carrier is applied to the cooking surface 14 by a spraying operation, such as shown in FIGURE 4, it is within the contemplation of the present invention to apply the frit mixture by dipping the skillet into a bath of the frit mixture. To accomplish this, an apparatus is schematically illustrated in FIGURE 6 and includes a tank 80 for holding a frit mixture 82 and a hook 84, or a similar device, for dipping the skillet A into the frit mixture. This will provide a non-fired frit layer on all surfaces of the skillet. Thereafter, the skilled A is fired so that the cooking surface may be provided with a Teflon layer and the outer surface may be provided with a colored enamel. This arrangement allows economical preparation of both interior and exterior surfaces of the skillet for subsequent coating.

Referring now to FIGURES 7–9, a further embodiment of the present invention is illustrated. In producing certain cooking utensils, the first operation is the formation of a blank 100 which includes a thin aluminum or stainless steel sheet 102 having a layer of Teflon 104. This blank is drawn, or otherwise formed, into a dish-shaped utensil, such as a baking pan B, as shown in FIGURE 8. Since the thickness of sheet 102 may be as small as .020 inch, the prior method of sand blasting the cooking surface to prepare the surface for the Teflon coating could not be used because the sheet would be seriously deformed. If the thickness of blank 100 were great enough so that the prior art method could be used for adhering the Teflon layer 104 onto the sheet 102, the drawn portion of pan B prepared by the prior method, if magnified, would appear somewhat as shown in FIGURE 10. The protrusions 20 and recesses 22 are flattened out during the drawing operation. Consequently, the relatively weak mechanical bond between the Teflon layer 104 and the sheet 102 would be further decreased. For this reason, when the cooking utensil is to be drawn, or otherwise formed, the prior method is even less satisfactory than when a cast body is to be used.

Referring now to FIGURE 9, by providing an intermediate ceramic layer 40 between surface 196 of the sheet 102 and the Teflon layer 104, drawing or forming of the blank 100 does not seriously damage, or affect, the mechanical and/or chemical bond between the peaks 46 and valleys 48 and the primer Teflon layer 30. It is noted that the peaks are canted during the drawing operation; however, they are not drawn out into a flattened configuration as is the case of the protrusions and recesses produced by the prior art method as shown in FIGURE 10. Consequently, by utilizing the present invention, a tight bond is maintained between the Teflon layer 104 and the metal sheet 102 after the drawing or forming operation.

To better appreciate the present invention, certain examples of the method utilized are hereinafter set forth.

EXAMPLE I

Skillet A is formed from cast aluminum with the surface being textured by the mold surface in accordance with known and somewhat conventional procedures. A commercial heavy metal frit is used. These frits are known to be glass compositions including such metals as lead, zinc, cadmium or antimony and having melting points of approximately 950–1000° F. Accordingly, they are adapted for firing onto an aluminum base. The commercial grades of heavy metal frit generally include aggregations of various grain sizes; therefore, to obtain uniform results, the frit is first ball milled, or otherwise masticated, to a grain size where most, or a preponderance, of the frit passes through a 300–325 mesh screen. Aluminum oxide having a small grain size which may be somewhat larger than the grain size of the frit is mixed with the ground heavy metal frit in various proportions, which are not critical and can be easily determined by a person with ordinary skill in the art of using frits. This heavy metal frit with the aluminum oxide additive is mixed with water to form an aqueous solution, generally known as "slip."

The slip is sprayed onto the textured inner surface of the cast skillet and the skillet is conveyed through a long firing furnace having a succession of infra-red burners which are spaced along the path of the moving skillet to present a series of heated and somewhat relatively unheated zones. The ambient temperature or unheated zones of the firing furnace are at a temperature of approximately 800° F., which is below the melting temperature of the frit and the aluminum of the skillet, and the heated zones directly under the burners have a temperature of approximately 1200° F., which is above the melting temperature of the frit and, also, above the melting temperature of the aluminum. Melting of the aluminum is prevented by subjecting the skillet to the higher temperatures of the heated zones for a time which is insufficient for melting or softening of the aluminum. The intermediate lower temperature or unheated zones prevents melting of the skillet itself. The conveying speed and the number of heating zones in the furnace are variable, and they are determined by the speed of the skillet and the number of skillets to be processed per unit time, i.e., the mass/time passing through the furnace.

When the skillet comes from the furnace, the inner surface has a matte finish which has been previously explained and which is superior for the attachment of Teflon thereto. It has been found that there is an actual chemical bond between the fired frit and the aluminum cooking surface of the skillet. The aluminum oxide, which has a melting temperature higher than the firing temperature of the frit, remains intact and provides a jagged exposed surface which enhances the Teflon coherence.

Thereafter, a standard No. 850 Teflon, marketed by Du Pont, is mixed with an appropriate accelerator, and the mixture is sprayed onto the inner surface of the skillet to cover the fired frit. The Teflon mixture flows between the jagged portions of the aluminum oxide. Thereafter, the Teflon is set by being heated to a temperature of approximately 450° F. Since the curing temperature of the Teflon is approximately 750–800° F., this initial heating or setting operation is not sufficient to cure completely the first coat of Teflon. The thickness of this coat, which may be termed a primer coat, is in the range of .2–.4 mil.

Since the skillet is to be used in the preparation of foodstuffs, an outer non-toxic layer of Teflon must be applied. This layer has a thickness of approximately .6–.8 mil and comprises No. 855 Du Pont Teflon. Complete curing of the outer Teflon layer and the primer coat is accomplished by heating the two layers to a temperature of approximately 750–800° F.

It has been found that the intermediate ceramic layer forms a hard layer which is chemically bonded to the skillet and tightly bonded to the Teflon. Scraping of the Teflon from the ceramic is considerably less possible than in the prior art where the Teflon was bonded directly onto the skillet or utensil cooking surface.

EXAMPLE II

The commercial heavy metal frit is ball milled or otherwise masticated to a grain size which will substantially inhibit flow out of the frit particles during firing. These grains must be, generally, larger than the size which will pass through a 300 mesh screen. In practice the particles of frit have a grain size which will allow passage of a preponderance of the grains through a 150–200 mesh screen. In this example, no aluminum oxide is added; however, the frit is fired in a similar manner. The primer coat of Teflon No. 850, marketed by Du Pont, and the outer layer of Teflon No. 855, also marketed by Du Pont, are applied and cured in accordance with the procedure outlined in Example I.

It has been found that the intermediate ceramic layer forms a hard layer which is chemically bonded to the skillet and tightly bonded to the Teflon. Again, although less so than in the product manufactured in accordance with Example I, scraping of the Teflon from the ceramic is less possible than in the prior art where the Teflon was bonded directly onto the skillet or utensil cooking surface.

EXAMPLE III

The procedure as outlined in Example I is also appropriate for thin aluminum blanks before they are drawn into shallow utensils, such as a baking pan. In this example, one surface of the blank is polished by an abrasive wheel or belt, the ceramic layer is applied and, then, the two Teflon layers are applied.

During a subsequent drawing operation, the bond between the separate layers was found to be unaffected. The Teflon remained in place on the polished surface and scraping of the Teflon from the surface was difficult without a very sharp instrument with a substantial force.

It has been found that the cost of practicing my invention is not greater than the cost of the prior method which included the added step of sand or shot blasting the cooking surface to prepare the surface for the Teflon. Another advantage of my invention was realized when a handle receiving bolt was stud welded onto the skillet A after the Teflon was coated on the cooking surface. In the past, this stud welding operation had to be performed before the Teflon coating was applied because the Teflon was melted by the heat of the welding operation. With the intermediate ceramic layer 40 beneath the Teflon, the Teflon is somewhat insulated from outside of the skillet. This insulation is not sufficient to affect cooking; however, it has been demonstrated to be sufficient to prevent conduction to the Teflon during the stud welding operation. Accordingly, the stud welding operation can be performed after the Teflon is applied. This allows more versatility in planning the manufacturing sequence of the skillet.

A Teflon coating applied by the present invention is not easily removed from a metal base. This phenomenon may have various explanations. For instance, the substratum below the Teflon applied by the prior method was aluminum which is relatively soft; therefore, an implement could dig through the Teflon and into the aluminum which facilitates easy removal of the surface Teflon. With the intermediate layer of ceramic as contemplated by the present invention, the substratum is hard ceramic and an implement can not easily penetrate the substratum and release the Teflon. Thus, the Teflon can not be easily separated from the ceramic or the metal.

The present invention has been described in connection with certain physical embodiments and certain examples; however, it is appreciated that various changes may be made in these embodiments and examples without departing from the intended spirit and scope of the present invention as defined in the appended claims. For instance, the disclosed method may be used on articles other than cooking utensils, i.e., knives, snow shovels, etc. The prior method of applying a Teflon coating was completely inappropriate for these abusive uses.

Having thus described my invention, I claim:

1. A method of adhering a polytetrafluoroethylene layer onto an aluminum surface, said method comprising the steps of:
    (a) applying a mixture of a ground heavy metal frit and a carrier onto said surface;
    (b) firing said frit mixture by alternately heating said mixture at a higher temperature of approximately 1200° F. and cooling said mixture to a temperature below the melting temperature of said aluminum to provide a ceramic matte finish on said aluminum surface, the periods of heating at said higher temperature being sufficiently short to prevent melting of said aluminum;
    (c) cooling said fired frit;
    (d) applying polytetrafluoroethylene onto said fired frit; and,
    (e) heating said polytetrafluoroethylene to a temperature in the range of approximately 750–800° F.

2. A cooking utensil produced in accordance with the method defined in claim 1.

3. A method of adhering a polytetrafluoroethylene layer onto an aluminum surface, said method comprising the steps of:
    (a) applying a mixture of a powdered heavy metal frit, selected from the class consisting of lead frit, cadmium frit, zinc frit, antimony frit and a mixture of said frits, and a carrier onto said surface;
(b) forming a ceramic matte finish by firing said mixture at a higher temperature of approximately 1200° F. by alternately subjecting said mixture to said temperature and a substantially lower temperature, said lower temperature being less than the melting temperature of aluminum, the periods of heating at said higher temperature being sufficiently short to prevent melting of said aluminum;
(c) cooling said fired frit to a temperature below 750° F.;
(d) applying polytetrafluoroethylene onto said fired frit; and,
(e) heating said polytetrafluoroethylene to a temperature in the range of approximately 750–800° F.

4. A method of adhering a polytetrafluoroethylene layer onto an aluminum surface, said method comprising the steps of:
(a) casting said aluminum surface with a roughened texture;
(b) applying a mixture of a heavy metal frit selected from the class consisting of lead frit, cadmium frit, zinc frit, antimony frit and a mixture of said frits, and a carrier onto said surface;
(c) forming a ceramic matte finish by firing said mixture at a higher temperature of approximately 1200° F. by subjecting said mixture to said temperature and a substantially lower temperature, said lower temperature being less than the melting temperature of aluminum, the periods of heating at said higher temperature being sufficiently short to prevent melting of said aluminum;
(d) cooling said fired frit to a temperature below 750° F.;
(e) applying polytetrafluoroethylene onto said fired frit; and,
(f) heating said polytetrafluoroethylene to a temperature of approximately 750–800° F.

References Cited

UNITED STATES PATENTS

| | | | |
|---|---|---|---|
| 2,990,294 | 6/1961 | Long | 117—75 |
| 3,324,280 | 6/1967 | Cheney et al. | 117—75 X |
| 2,146,858 | 2/1939 | Scott | 117—23 |
| 2,707,703 | 5/1955 | Dorst | 117—75 X |
| 2,979,418 | 4/1961 | Dipner | 117—75 X |
| 3,008,601 | 11/1961 | Cahne | 117—132 X |
| 3,143,241 | 8/1964 | Howell. | |
| 3,211,325 | 10/1965 | Wisnicki. | |
| 3,311,494 | 3/1967 | Reinert et al. | 117—75 |

FOREIGN PATENTS

| | | |
|---|---|---|
| 622,338 | 3/1963 | Belgium |
| 944,836 | 12/1963 | Great Britain. |
| 1,025,505 | 4/1966 | Great Britain. |
| 1,042,012 | 9/1966 | Great Britain. |

ALFRED L. LEAVITT, *Primary Examiner.*

J. R. BATTEN, JR., *Assistant Examiner.*